T. B. GRUNWELL.
FLY TRAP.
APPLICATION FILED JUNE 2, 1914.
1,200,834.
Patented Oct. 10, 1916.
2 SHEETS—SHEET 1.
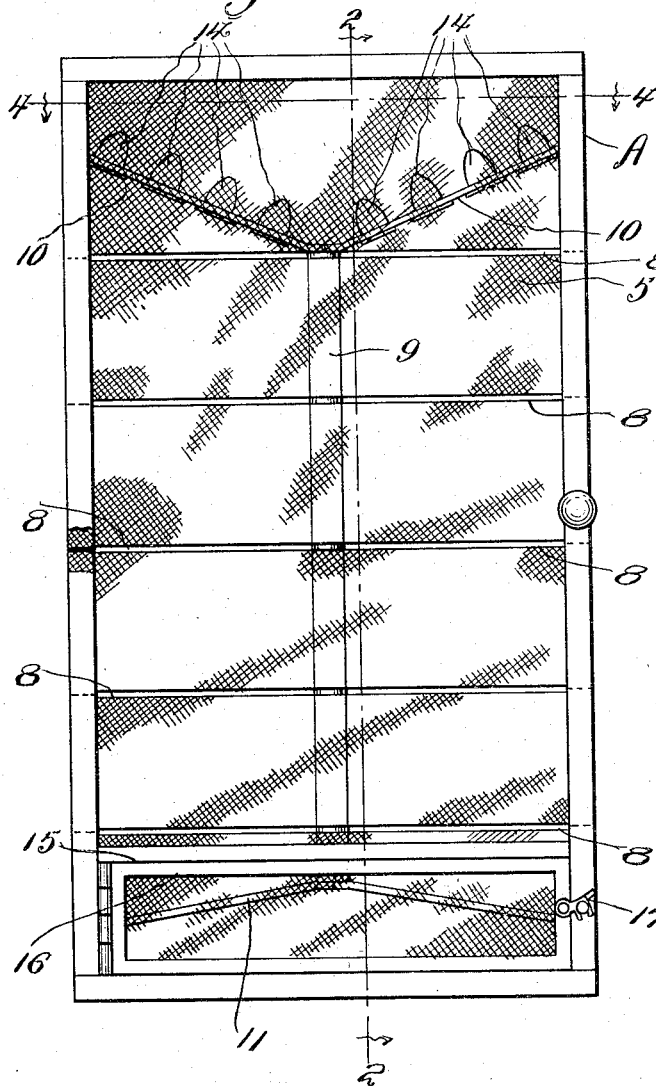
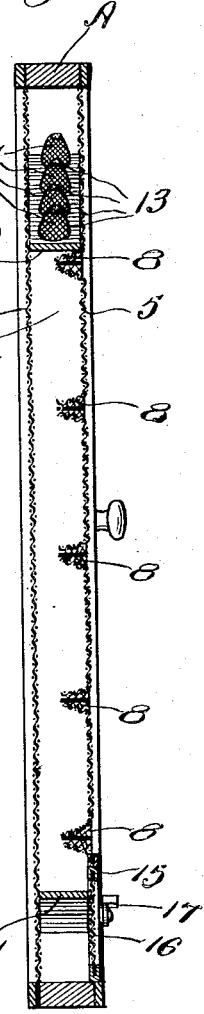
Inventor
T. B. Grunwell
By Victor J. Evans
Attorney
Witnesses T. B. GRUNWELL.
FLY TRAP.
APPLICATION FILED JUNE 2, 1914.
1,200,834.
Patented Oct. 10, 1916.
2 SHEETS—SHEET 2.
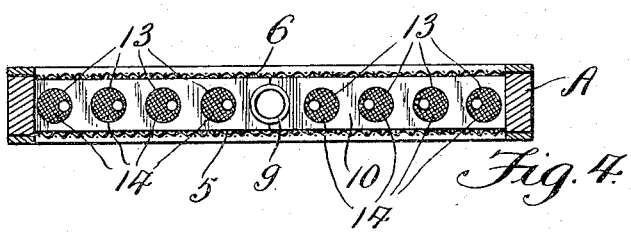
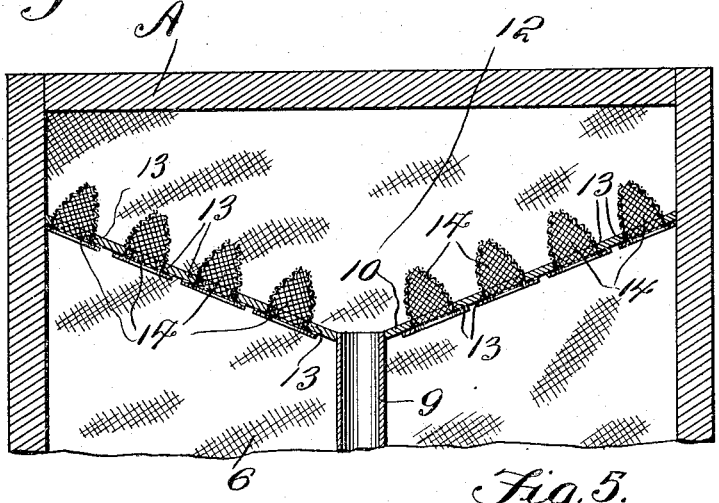
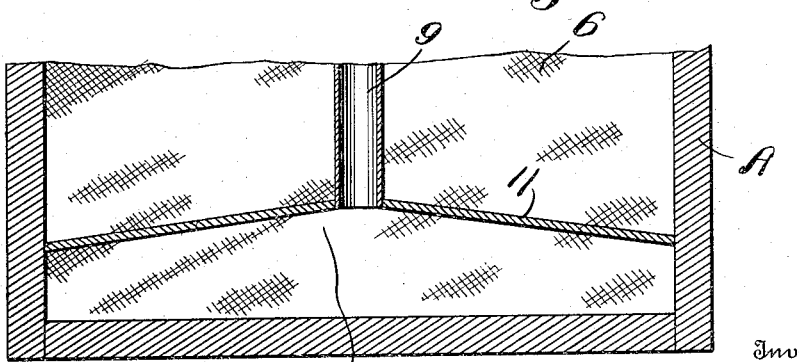
Witnesses
J. L. Wright
Inventor
T. B. Grunwell
By Victor J. Evans
Attorney

UNITED STATES PATENT OFFICE.

THOMAS B. GRUNWELL, OF PRESCOTT, WASHINGTON.

FLY-TRAP.

1,200,834. Specification of Letters Patent. Patented Oct. 10, 1916.

Application filed June 2, 1914. Serial No. 842,432.

*To all whom it may concern:*

Be it known that I, THOMAS B. GRUNWELL, a citizen of the United States, residing at Prescott, in the county of Walla Walla and State of Washington, have invented new and useful Improvements in Fly-Traps, of which the following is a specification.

The invention relates to door or window screens, and more particularly to the class of fly or insect trap screens.

The primary object of the invention is the provision of a screen of this character wherein flies or insects will be caught and trapped therein so as to exterminate the same, and in this manner obviating the possibility of the flies or insects gaining an entrance to a building or other inclosure.

Another object of the invention is the provision of a screen wherein the dead flies or insects will be delivered to the bottom of the screen so that the same can be readily removed therefrom, thus enabling the screen to be rendered thoroughly sanitary.

A further object of the invention is the provision of a screen of this character wherein the flies or insects can gain an entrance thereto, yet will be prevented from an exit, thus trapping the flies or insects for the killing of the same.

A still further object of the invention is the provision of a screen of this character which is novel in construction, strong, durable, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—Figure 1 is a front elevation of a screen constructed in accordance with the invention. Fig. 2 is a vertical longitudinal sectional view on the line 2—2 of Fig. 1. Fig. 3 is a fragmentary vertical transverse sectional view through the screen. Fig. 4 is a sectional view on the line 4—4 of Fig. 1. Fig. 5 is an enlarged fragmentary vertical sectional view through the screen.

Similar reference characters indicate corresponding parts throughout the several views in the drawings.

Referring to the drawings in detail, the screen comprises a door frame A, which is preferably made from wood, although it may be made from other material, and is of the usual construction, having fixed to opposite faces wire mesh fabric 5 and 6 respectively, which extends throughout the entire length of the frame to form a space 7 therebetween. The outer wire mesh fabric 5 or 6 is cut to form a series of slots, the longitudinal edges thereof being inturned to provide flanges 8 which are spaced from each other to provide entrance slots so that flies or insects crawling upon the wire mesh fabric 5 or 6 will pass through the slots to the interior space 7 of the screen to be caught therein.

Arranged within the space 7 centrally of the frame A is a tubular column or pipe 9 which has its opposite ends fitted in head and foot brace members 10 and 11 respectively, the latter being secured to the vertical portions of the frame A and serve as partitions to form traps 12 at both ends of the screen, which are in communication with each other through the column or pipe 9 so that flies trapped in the upper space 12 will be delivered through the column or pipe 9 to the lower space 12 within the screen.

Formed at intervals in the brace member 10 at the head of the screen are apertures 13 which communicate with cone-shaped thimbles 14 suitably fixed to the said member 10, and form restricted entrances to the uppermost space 12 from the space 7 between the wire mesh fabric on opposite faces of the frame A of the screen so that flies within the space 7 can pass through the thimbles 14 into the uppermost space 12 to be trapped therein. Now, assuming that flies have been trapped in the uppermost space 12, on the jarring or the opening and closing movement of the screen the flies trapped in the upper portion thereof will be conveyed through the column or pipe 9 into the lowermost space 12 of the screen so that the dead flies or insects may be conveniently removed from the latter after the trapping thereof.

At the front of the frame A near the lower end thereof is provided a doorway 15, the same being closed by means of a swinging gate or door 16 provided with suitable catches 17 for sustaining it closed, and through this doorway 15 access may be had to the lowermost space 12 for the removal of the dead flies or insects therein. In this manner the screen can be rendered thoroughly sanitary. It will be apparent that the flies and insects will be trapped by the screen, and that the same will be prevented from gaining entrance to a room, building or other inclosure. Furthermore, by the trapping of the flies as hereinbefore set forth the same will be exterminated.

From the foregoing it is thought that the construction and manner of use of the device will be clearly understood, and therefore a more extended explanation has been omitted.

What is claimed is:—

An insect trap comprising a frame, wire mesh fabrics secured to the opposite side of said frame, and constituting front and rear walls, one of said walls being provided with entrance slots, partitions mounted between said walls adjacent the opposite ends of said frame and forming trapping chambers, said partitions diverging from their medial portion, the upper partition being provided with restricted openings, and a pipe having the opposite ends thereof connected to the medial portions of said partitions and forming a communicating passage way between said trapping chambers.

In testimony whereof I affix my signature in presence of two witnesses.

THOMAS B. GRUNWELL.

Witnesses:
 CHAS. H. O'NEIL,
 CHAS. R. DUTRO.

Copies of this patent may be obtained for five cents each, by addressing the "Commissioner of Patents Washington, D. C."